United States Patent Office 2,731,440
Patented Jan. 17, 1956

2,731,440

STABILIZATION OF VINYL CHLORIDE RESINS WITH ORGANOTIN TRIMERCAPTIDES

Eugene P. Stefl, Churchill Valley, Pa., and Chris E. Best, Franklin Township, Summit County, Ohio, assignors to The Firestone Tire & Rubber Company, Akron, Ohio, a corporation of Ohio No Drawing. Application October 5, 1950,
Serial No. 188,654

22 Claims. (Cl. 260—45.75)

This invention relates to the stabilization, against deterioration by heat, of vinyl chloride polymer and copolymer resins under extremely drastic and non-conventional conditions of temperature and mechanical working during calendering operations carried out thereon.

Vinyl chloride polymer and copolymer resins, being thermoplastic, are commonly heated to soften them during fabrication by extrusion, calendering and like operations. Such heating is limited in degree and duration by the tendency of the resins to decompose. A number of stabilizing agents, more or less effective, have been proposed for incorporation into vinyl chloride resins to inhibit such deterioration; however, none of these proposed materials have been entirely satisfactory. Particularly, investigations by the applicants' associates have indicated that it would be highly desirable to calender vinyl chloride resins at somewhat higher temperatures (say on the order of 315°–360° F., and even, for brief intervals, at temperatures on the order of 380°–400° F.) rather than the somewhat lower temperatures now employed for this purpose, as the higher temperatures would result in better fusion of the film as reflected in improved clarity, tear strength, tensile strength and flexibility. Higher temperatures also permit the calenders to be operated at much higher speeds, thereby greatly reducing the cost of converting the basic resins to film and other sheetings. None of the stabilizers proposed in the prior art, with the possible exception of certain lead compounds, have been sufficiently reliable in the higher range of temperature to be practical, and accordingly commercial films calendered from compositions containing conventional stabilizers fall short of ideal properties of transparency, mechanical strength, and flexibility. The lead compounds, however, discolor badly when exposed to even minute concentrations of hydrogen sulfide, such as may occur in the vicinity of elastic rubber bands used in refrigerator dish covers made from vinyl films. In addition to aiming at stabilization at the more ideal higher range of temperatures, a stabilizer must fulfill a number of other essential and rather exacting requirements; the stabilizer must be effective over considerable periods of time, for instance as long as 30 minutes; and the stabilizer must not adversely affect the color, transparency or odor of the film produced. A low degree of toxicity and allergenic action is also desirable in such stabilizers.

Accordingly it is an object of this invention to provide novel heat stabilizers for vinyl chloride polymer and copolymer resins.

Another object is to provide heat stabilizers for such resins which will be effective at higher temperatures, and for longer periods of time, than any other substances heretofore proposed for this purpose.

A further object is to provide such heat stabilizers which will be effective in stabilizing vinyl chloride resins on the calender at temperatures in the range 315°–350° F., for extended periods of time such as 30–60 minutes.

A further object is to provide stabilizers for vinyl chloride resins which will not adversely affect the color, clarity, transparence or odor of films and other products made therefrom.

A still further object is to provide stabilizers for vinyl chloride resins which will not be subject to discoloration in the presence of hydrogen sulfide.

A still further object is to provide such stabilizers which are non-toxic and non-allergenic.

Reference is made to the copending application of Stefl and Best, Ser. No. 188,653, filed October 5, 1950, which relates to the organotin trimercaptides as novel compounds.

SYNOPSIS OF THE INVENTION

The above and other objects are secured, in accordance with this invention, by the incorporation, into a vinyl chloride polymer or copolymer resin formulation, of from 0.25 to 5.0% of a monoorganotin trimercaptide of the formula

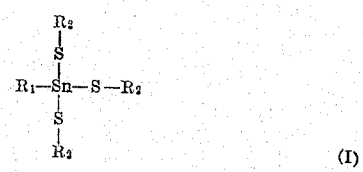

(I)

in which formula:

$R_1$, independently in each occurrence, represents an organic radical consisting of from 1 to 22 carbon atoms, hydrogen, carbon-carbon single bonds, carbon-hydrogen bonds, (optionally) aromatic ring carbon-carbon double bonds and (also optionally) a maximum total of four innocuous structures such as carbon-carbon triple bonds, aliphatic carbon-carbon double bonds, ether linkages, thioether linkages, carboxylic ester groups bonded to carbon atoms, fluorine atoms linked to carbon atoms, and halogen atoms bonded to aromatic ring carbon atoms, and $R_2$, independently in each occurrence represents an organic radical consisting of from 1 to 22 carbon atoms, hydrogen, carbon-carbon single bonds, carbon-hydrogen bonds, (optionally) aromatic ring carbon-carbon double bonds, and (also optionally) a maximum total of four innocuous structures such as carbon-carbon triple bonds, aliphatic carbon-carbon double bonds, hydroxyl groups bonded to carbon, sulfhydryl groups bonded to carbon, ether linkages, thioether linkages, carboxylic ester groups bonded to carbon atoms, carboxylic amide groups bonded to carbon atoms, fluorine atoms bonded to carbon atoms, halogen atoms bonded to aromatic ring carbon atoms, and groups of the formula

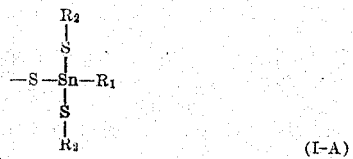

(I-A)

under the same notation.

In the above and all following formulae, the atoms in the groups $R_1$ and $R_2$ attached to the sulfur and tin atoms must always be carbon atoms. It will also be understood that the innocuous groups mentioned as optional constituents of the radicals $R_1$ or $R_2$ need not all be identical in any given radical $R_1$ or $R_2$, but their total number, enumerated without distinction as to kind of innocuous group, must not exceed four in any given radical $R_1$ or $R_2$.

The compounds may conveniently be prepared by reacting mercaptans of the formula

  (II)

with organostannic acids of the formula

  (III)

all under the notation given in connection with Formula I above. Water is eliminated, with formation of the desired Compounds I.

THE SUBSTITUENTS $R_1$ AND $R_2$

The groups $R_1$ and $R_2$ in the formulae above may be substantially any substituents which (a) are not too large for convenient synthesis and reactivity and (b) do not contain any groups which will interfere with the synthesis or existence of the compounds. It will be understood, of course, that the atoms in the radicals $R_1$ and $R_2$ attached to the sulfur and tin atoms must be carbon atoms. In practice, a range of from 1 to 22 carbon atoms in each of the radicals $R_1$ and $R_2$ will cover the field of radicals which will be conveniently available and not too large to be readily reactable in the synthesis of the compounds of this invention. The radicals $R_1$ and $R_2$ may be, and from the standpoint of ready procurement and avoidance of complications in synthesis preferably are, simple monovalent hydrocarbon radicals containing only single bonds between the carbon atoms or aromatic ring double bonds between the carbon atoms (practically, there will be a maximum limit of 11 such double bonds in any radical), for instance alkyl, cycloalkyl, aryl, aralkyl, alkaryl and like monovalent hydrocarbon radicals containing from 1 to 22 carbon atoms. Likewise these radicals, in addition to simple hydrocarbon structure, may contain various other groupings which are sufficiently low in number, and of sufficiently non-reactive character, as not to interfere with the synthesis of the compounds of this invention. Structures which have been found innocuous and non-interfering in either of the radicals $R_1$ and $R_2$ are, inter alia, aliphatic ethylenic linkages (as distinguished from the unsaturated bonds in aromatic rings, which may be present in numbers limited only by the size of the radical $R_1$ or $R_2$ in question) acetylenic linkages, ether linkages, thioether linkages, carboxylic ester linkages, fluorine atoms bonded to carbon atoms, and halogen atoms bonded to aromatic ring carbon atoms. The radical $R_2$, in addition to the above innocuous groups, will also tolerate other groups such as hydroxyl groups, sulfhydryl groups and carboxylic amide groups. Likewise, the radical $R_2$ may be linked through sulfur atoms to more than one organic substituted tin atom, in which case the radical $R_2$ of the Formula I will contain a further group of the formula

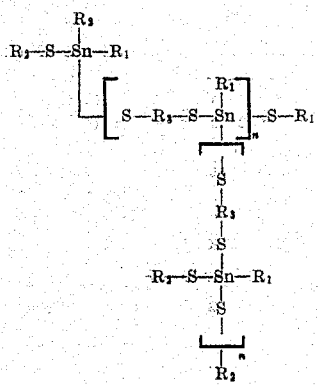

(I-A)

in addition to the tin atom grouping of this character already shown in Formula I. It will be understood that the groups $R_2$ in the Formula I-A admit of still further successive expansion, so as to include network polymeric materials of the type

(IV)

wherein:

$R_3$ is a divalent organic radical satisfying the criteria of the radical $R_2$ as above defined, save in that $R_2$ is monovalent $R_1$ and $R_2$ are as above defined, with the understanding that $R_2$ may be further expanded into structures involving $R_3$-linked branched and network chains such as illustrated $n$ in each occurrence is an integer from 1 to a practical (there would be no thoretical) limit of 10.

In general, it has been found that from 1 to 4 of the innocuous groups set forth above may be present in each of the radicals $R_1$ and $R_2$ in the formulae above.

Of all the radicals coming within the ambit of $R_1$ and $R_2$ as above defined, the simple hydrocarbon radicals containing not more than a combined total of four non-aromatic ethylenic linkages and acetylenic linkages will be preferred, as the starting materials for these compounds will be most readily accessible, and less complications will be encountered in the synthetic steps leading to the compounds of this invention.

It has also been observed in the practice of this invention that tertiary mercaptans react less readily and completely than do other compounds in the formation of the alkyltin mercaptide stabilizers employed in this invention. These mercaptides therefore constitute a less preferred class of compounds for use in this invention, while nevertheless remaining within the ambit thereof.

It is to be understood, of course, that the radicals $R_1$ and $R_2$ in their several occurrences need not be, and in many cases are not, identical with each other, but may be different radicals each individually coming under the definition of such radicals as given above; and that a preparation in accordance with this invention need not be a pure compound but may be a mixture of compounds each coming under the general Formula I above, such as would result, for instance, when starting materials were used which would supply mixtures of radicals, for instance starting materials derived from natural sources or from petroleum fractions.

THE PREPARATION OF THE ORGANOTIN MERCAPTIDES

A convenient synthesis for the compounds employed as stabilizers in accordance with this invention involves the reaction

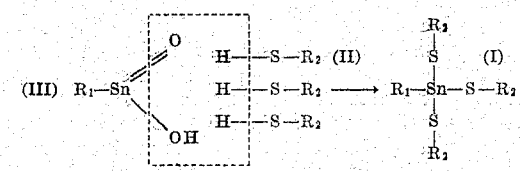

wherein $R_1$ and $R_2$ are as defined above in connection with Formula I. It will be understood that the Formula III for the organostannic acid is somewhat idealized, since these compounds occur largely as pyro acids of varying degrees and complexity of condensation; however, the pyro acids mercaptolize fairly readily under the conditions of the reaction, which therefore proceeds effectively as shown. In some preparations of organostannic acid, the degree of condensation may be so high as to result in somewhat reduced yields, and it will be preferred to employ acids of a relatively low degree of condensation. It is to be understood that in many cases the three mercaptan molecules indicated by the notation "H—S—R₂" are identical mercaptan molecules, assuming that an unmixed mercaptan is supplied to the reaction; if a mixture of mercaptans is supplied to the reaction, these will distribute themselves, in accordance with the reactivities involved, between reactive engagements in which the mercaptan molecules reacting with a given organostannic acid are all identical, and those in which the mercaptan molecules are not all identical (e. g. two alike and one dissimilar, or all three dissimilar) and are arranged at the several positions on the tin atom in various complexions. In accordance with the notation above, the radicals R₂ may themselves contain thiol groups, i. e., the mercaptan (II) may have the formula

as R₃ is defined above in connection with the Formula IV, in which case a greater or less proportion of the mercaptan (II) will react with two organostannic acid molecules (III) resulting in reticulate structures such as indicated by Formula IV. The reaction is readily and simply carried out by mixing the mercaptans (II) together with the organostannic acid (III) and heating the mixture with stirring at temperatures in the range 40° C.– 180° C. In most cases the mercaptons will not be volatile under these conditions and the reaction may be carried out in open vessels; however, some of the lower mercaptans may have appreciable, or even superatmospheric vapor pressures at these temperatures, in which case the reaction may be carried out in closed vessels with provision for reflux and, if necessary to confine the reactants, maintenance of superatmospheric pressure. The reaction is more readily controlled if not all the organostannic acid is added at the outset, but rather is added in increments as the reaction proceeds. The reactants will be used in substantially equivalent proportions, as the reaction is substantially quantitative; however, to the extent that the proportionation is inaccurate, the mercaptan should be used in excess, as the organostannic acid is usually more expensive ingredient and, in the case of organostannic acids manufactured by certain techniques devised by associates of the present patentees, will be lost along with the salt which accompanies it as an incident of its manufacture. Economic or technical considerations may in many cases bring about a reversal of these recommendations in particular cases. The reaction goes very rapidly, giving a good yield almost instantly upon mixing, and going substantially to completion in the course of an hour or so. The reaction may be carried out in the absence of a solvent, since the mercaptan employed will usually be a liquid, or at least fusible at the temperature of reaction. Alternatively, a suitable non-reactive solvent may be employed, such as hydrocarbon solvents on the order of petroleum ether, benzene, toluene, xylene or the like, or chlorinated solvents such as carbon tetrachloride, trichloroethylene, tetrachloroethylene, hexachlorobutadiene, and the like. When a solvent is employed, it may be evaporated out of the reaction mass to entrain and remove the water resulting from the reaction.

As noted above the radicals R₁ and R₂ are not critical in nature and may be selected from a wide variety of substituents, examples of which are listed. The radicals R₂ are derived from the mercaptan or mercaptans supplied to the reaction, while the radicals R₁ are those attached to the tin atom in the organostannic acid supplied to the reaction. Given herewith are selected lists of mercaptans and organostannic acids conforming to the requirements of the radicals R₁ and R₂ given above. Any one of these or similar mercaptans may be reacted with any of these or similar organistannic acids to yield compounds for use as stabilizers in this invention.

*Table I.—Mercaptans*

Methyl mercaptan
Butyl mercaptan
Amyl mercaptan
n-Hexyl mercaptan
2-ethyl hexyl mercaptan
tt-Octyl mercaptan
Decyl mercaptan
Dodecyl mercaptan
Mixed mercaptans derived from fatty radicals of cocoanut oil or other natural fatty oils
Mercaptans from trimerized isopropylene
Mercaptans containing the alkyl radicals of kerosene petroleum fractions
Tridecyl mercaptan
Oleyl mercaptan
Thioabietinol, or other mercaptans derived from the hydrocarbon residues of naval stores products, tall oil etc.
Mercaptans derived by conversion to mercaptans of the alcohols produced by the carbon monoxide-hydrogen synthesis, or of the mixed alcohols produced by the "oxo" process
Mercaptans produced by reduction of the alkyl sulfonic acids resulting from ultraviolet-sulfuryl chloride treatment of paraffins
2-mercaptoethanol
2(2-mercaptoethaxy)ethanol
2-ethyl hexyl thioglycolate
2-mercaptoethyl stearate
2-mercaptoethyl stearamide
Eicosyl mercaptan
Benzyl mercaptan
o-, m-, and p-Chlorobenzyl mercaptan
4,4'-diphenylether dithiol
Octyl phonoxy mercaptoethyl ether, i. e., 2-(2-octyl phenoxy)ethoxy ethane thiol
Thiophenol
o-, m-, and p-Chlorothiophenol
Thio-p-cresol
α-Thionaphthol
β-Thionaphthol
Thiophenethiol
Mercaptobenzimidazole
Thiocalicylic acid
Thiocinnamic acid
2-mercapto methyl benzoate
p-Bromochiophenol
p-Trifluoromethyl thiophenol

*Table II.—Organostannic acids*

Methylstannic acid
Ethylstannic acid
Butylstannic acid
Isobutylstannic acid
n-Hexylstannic acid
2-ethylhexyl stannic acid
Laurylstannic acid
Alkylstannic acid in which the alkyl groups are the mixed alkyl groups derived from cocoanut oil
n-Hexadecyl stannic acid
Phenylstannic acid
α-Naphthyl stannic acid
2-thienyl stannic acid
Xenyl stannic acid
Ethoxyethyl stannic acid

THE VINYL CHLORIDE RESINS TO BE STABILIZED IN ACCORDANCE WITH THIS INVENTION

The vinyl chloride resins are a well-known class of materials consisting of simple polymers of vinyl chloride, and copolymers of vinyl chloride in which the essential polyvinyl chloride polymer chains are interspersed at intervals with the residues of other monoethylenically unsaturated compounds or conjugated diethylenically unsaturated compounds. In general, any resin having a substantial proportion of the polyvinyl chloride chain structure, so as to be susceptible to heat degradation by mechanisms involving the polyvinyl chloride chain, will be benefitted by the addition of the stabilizers of this invention. This will include any vinyl chloride copolymers containing not more than 40%, based on the total weight of the resins, of these extraneous unsaturated compounds.

Conversely stated, the resins must contain at least 60% of vinyl chloride copolymerized therein. Suitable compounds for copolymerization with vinyl chloride include, for instance, vinyl esters on the order of vinyl bromide, vinyl fluoride, vinyl acetate, vinyl chloroacetate, vinyl butyrate, other fatty acid vinyl esters, vinyl alkyl sulfonates and the like; vinyl ethers such as vinyl ethyl ether, vinyl isopropyl ether, vinyl chloroethyl ether and the like; cyclic unsaturated compounds such as styrene, the mono- and polychloro- styrenes, coumarone, indene, vinyl naphthalenes, vinyl pyridines, vinyl pyrrole and the like; acrylic acid and its derivatives such as ethyl acrylate, methyl methacrylate, ethyl methacrylate, ethyl chloroacrylate, acrylonitrile, methacrylonitrile, diethyl maleate, diethyl fumarate, and the like; vinylidene compounds on the order of vinylidene chloride, vinylidene bromide, vinylidene fluorochloride, and the like; unsaturated hydrocarbons such as ethylene, propylene, isobutene and the like; allyl compounds such as allyl acetate, allyl chloride, allyl ethyl ether and the like; and conjugated and cross-conjugated ethylenically unsaturated compounds such as butadiene, isoprene, chloroprene, 2,3-dimethylbutadiene-1,3, piperylene, divinyl ketone and the like. For a fairly complete list of materials known to polymerize with vinyl chloride, reference may be had to Krczil, "Kurzes Handbuch der Polymerisations Technik, II:Mehrstoff Polymerization," Edwards Bros. Inc., 1945, pp. 735–747, the items under "Vinyl chlorid." As a rough rule, the criterion of a practical comonomer for use with vinyl chloride to produce copolymers containing 60% or more of vinyl chloride is that, on a mole percentage basis, an initial charge of 96% vinyl chloride, balance comonomer, shall yield an initial copolymer containing (a) at least 90% vinyl chloride, and (b) not more than 99% vinyl chloride. On this basis, satisfactory comonomers for use with vinyl chloride will be those having "$Q_2$" and "$e_2$" values, as described in J. Polymer Science 2:101, correlated as follows, assuming for vinyl chloride $$Q_{vinyl\ chloride}=.03\ and\ e_{vinyl\ chloride}=.3:$$

$$4.1 > \frac{.029 e^{-.3(.3-e_2)}}{Q_2} + .04 > .37$$
$$\frac{}{1.33 Q_2 e^{e_2(.3-e_2)} + .96}$$

Instead of the single unsaturated comonomers of the types above indicated, mixtures of such comonomers may enter into the copolymers, it being understood that the total quantity thereof shall be small enough (i. e., not over 40%, based on the weight of copolymer) that the essential character of the polyvinyl chloride chain is retained.

With regard to the amount of the monoorganotin trimercaptide to be incorporated into vinyl chloride resins to be stabilized in accordance with this invention, amounts of these compounds as low as 0.25%, based on the weight of vinyl chloride resin in the composition, will definitely enhance the resistance thereof to deterioration by heat and mechanical working. Generally from about 1% to 3% of the stabilizing composition, based on the weight of vinyl chloride resin in the composition, will be preferred. Greater quantities, up to about 5%, may be employed, but usually no great additional advantage will be obtained from the increased quantities.

PROCESSING OF THE COMPOSITIONS OF THIS INVENTION

The compositions of this invention are characterized by extraordinary resistance to heat and mechanical working, not possible with any of the stabilizers proposed in the published prior art except perhaps for the lead compound stabilizers, which discolor when exposed to hydrogen sulfide. They are capable of being mechanically worked at 310°–340° F. for periods of one-half to one hour; at 340°–380° F. for periods up to ten minutes; and for periods of a minute or two at 400 C., as on a high-speed calender. This permits of a much better fusion of the resin than is obtained in ordinary working, resulting in films and other products of outstanding clarity, homogeneity and strength, and in much higher permissible calender speeds. Accordingly, the present invention is of especial application to the calendering of vinyl films in which the final bank of resin in the calender is in the neighborhood of 380°–400° F., a practice not practical on a commercial basis with conventional stabilizers, except as above noted, with the lead stabilizers which have other serious disadvantages. Such films will usually range in thickness from .002 to .010 inch and, when unpigmented, will have much greater clarity than similar films calendered at the lower temperatures which must be used with conventional stabilizers. In any event, the films will have improved color stability and tenacity. The severity of calendering temperatures at these high temperatures will be appreciated when it is realized that the stock must be compounded and warmed up in banbury and warm-up mills, and that the edge trimmings of the calendered film (which will generally accumulate as slow-cooling gobs at the film temperature at the trimmers) must be recycled if the process is to be economic. In film calendering operations referred to hereinbelow, it is to be understood that these rigorous practices were employed.

The stabilizers of this invention are also useful in calendering or other modes of hot fabrication of thicker sheeted products, such as artificial leathers, calender-coated fabrics, and the like. The stabilizers may also be used in resins for melt extrusion and hot molding processes.

With the foregoing general discussion in mind, there are given herewith detailed examples of the practice of this invention. All parts given are by weight.

EXAMPLE I

|  | Gram-mole |
|---|---|
| Mercaptan (per Table III) | .3 |
| Organostannic acid (per Table III) | .1 |

A series of monoorganotin trimercaptides was prepared by reacting together, in combinations set forth in Table III hereinbelow, .3 gram-mole portion of various mercaptans with .1 gram-mole portion of various organostannic acids. In each case the selected mercaptan was placed in an open beaker and heated to 125° C. (In those cases where the mercaptan was volatile, e. g. butyl mercaptan, the reaction was carried out in a closed vessel under reflux with a water trap, rather than in an open beaker.) The selected organostannic acid was then added with continuous stirring, in small portions, as rapidly as the foaming would permit. After all the organostannic acid had been added, and foaming had subsided, the temperature was raised to 150° C., held at this point for 15 minutes, and then reduced to 25° C. The cooled reaction mass was filtered to remove any unreacted material (in some cases, the organostannic acid contains insoluble salts and stannic oxide), and the filtrate taken as a substantially pure monoorganotin trimercaptide in which the organic groups directly attached to the tin were those originally present in the organostannic acid, and the organic groups linked to the tin through the sulfur atoms were those originally present in the mercaptans employed. In some cases, where the products were highly viscous or solid, the reaction mass was diluted with petroleum ether for the filtration, the solvent being stripped off after the filtration.

ratings are set forth herewith in Table III opposite the tabulation of the preparation of the compounds of this invention. By way of contrast, a composition in accordance with the above formula, but omitting the stabilizer, showed marked deterioration after as short a time as 15 minutes in the oven, see the last item in Table III.

Table III

| Constitution of Product | | Properties of Product | | Am't. Used (parts by weight) | Color of Test Specimen After Exposure in Oven for— | | | | | Run No. |
|---|---|---|---|---|---|---|---|---|---|---|
| Group Attached to Tin in Organostannic Acid Used | Groups Attached to Sulfur in Mercaptan Used | Melting Point, °C. | $n_D^{20}$ | | 15 Min. | 30 Min. | 60 Min. | 90 Min. | 120 Min. | |
| Methyl | Butyl | | 1.5541 | 2.0 | off-white | pale straw | straw | tan | tan | 1 |
| | sec. amyl | | 1.5452 | 2.0 | do | straw | do | do | do | 2 |
| | | | | .25 | pale straw | pale straw | pale straw | straw, brown edges. | tan, brown edge. | 3 |
| | Coconut [1] | | 1.4975 | .5 | white | off-white | do | straw | straw | 4 |
| | | | | 1.0 | do | do | do | light tan | tan | 5 |
| | | | | 2.0 | do | white | off-white | pale straw | light tan | 6 |
| | t-dodecyl | | | 2.0 | cream | pale straw | pale straw | straw | brown | 7 |
| | octadecyl | 50-60 | | 2.0 | off-white | off-white | off-white | off-white | pale straw black edge. | 8 |
| | alpha pinene mercaptan.[2] | | 1.5449 | 2.0 | do | do | straw | straw | straw | 9 |
| | 2-hydroxyethyl. | | 1.6168 | 2.0 | do | faint straw | light straw | light straw | straw, black edge. | 10 |
| | alpha naphthyl. | | 1.71 | 2.0 | do | off-white | straw | straw | do | 11 |
| | p-cresyl | 143-145° C.[3] | | 2.0 | faint yellow | pale straw | do | light brown | brown | 12 |
| | methyl- benzoate. | | 1.6579 | 2.0 | pale straw | light tan | brown | dark brown | black | 13 |
| | chlorobenzyl | | 1.6523 | 2.0 | white | white | off-white | pale straw | straw, black spot. | 14 |
| | diphenyl- ether di- thiol.[2] | | | 2.0 | faint yellow | faint yellow | yellow | yellow | muddy yellow | 15 |
| Ethyl | Cocoanut | | 1.4991 | 2.0 | white | white | white | white | pale straw | 16 |
| Butyl | Butyl | | 1.5420 | 2.0 | off-white | off-white | light straw | tan | brown | 17 |
| | Cocoanut [1] | | 1.5009 | 2.0 | white | do | off-white | off-white | pale straw | 18 |
| | t-Dodecyl | viscous liquid. | | 2.0 | cream | pale straw | pale straw | straw | brown | 19 |
| | p-Cresyl | | 1.6540 | 2.0 | white | off-white | straw | do | light brown | 20 |
| | Methyl-ben- zoate. | stiff, resinous product. | | 2.0 | light beige | light reddish brown. | light brown | brown | brown | 21 |
| Cocoanut [1] | Cocoanut [1] | | 1.4920 | 2.0 | off-white | off-white | pale straw | pale straw | straw | 22 |
| | p-Cresyl | | | 2.0 | white | do | do | straw | dark brown | 23 |
| Phenyl | Butyl | | 1.5710 | 2.0 | off-white | do | do | do | straw, black | 24 |
| | Cocoanut [1] | | 1.5124 | 2.0 | white | do | off-white | off-white | off-white, black edges. | 25 |
| Thienyl | p-Cresyl | | 1.6890 | 2.0 | off-white | do | pale straw | light tan | black | 26 |
| | Cocoanut [1] | | 1.4729 | 2.0 | do | do | dirty straw | dirty tan | dark brown | 27 |
| Control without stabilizer | | | | 0 | tan | dark tan | brown | dark brown | do | 28 |

[1] These are mixed fatty radicals, consisting largely of lauryl and myristyl, derived by reduction of the fatty acids of cocoanut oil.
[2] This is the name of the mercaptan employed, not the group attached to sulfur therein, as set out in the column heading.
[3] Recrystallized from heptane. Analysis indicated 18.93% sulfur as against a theoretical 19.1% sulfur.

The products were then tested as stabilizers in vinyl chloride resins as follows: (The parts given are by weight.)

| | Parts |
|---|---|
| Copolymer of 97% vinyl chloride, 3% vinylidene chloride | 100 |
| Di(2-ethylhexyl)phthalate | 46 |
| Tricalcium phosphate | 1 |
| Silicate pigment | 1 |
| Stabilizer compound under test | 2 |

A series of compositions was made up in accordance with the foregoing schedule, using as the stabilizer each of the organotin trimercaptides prepared as above described and tabulated below. In each case the listed ingredients, together with the compound under test, in the proportions indicated in the schedule, were thoroughly mixed together and placed on a laboratory roll mill at 320° F. Milling was continued for two minutes, at which time the gauge was set at .025 inch and the sheet removed from the mill and cooled.

Five one-inch square specimens of each of the sheets of each of the compositions prepared as above described were hung vertically in a forced-draft oven maintained at 170° C. Specimens of each of the compositions were removed after intervals of 15, 30, 60, 90 and 120 minutes of exposure in the oven, and were rated subjectively as to color and extent of deterioration by the operator, which Each of the stabilized compositions tabulated above was calendered out into a film .05 inch thick on a calender, the rolls of which were maintained at 350° F. Excellent fusion of the resin was obtained, which films had much greater transparency and clarity than is obtained in films calendered at conventional lower temperatures. No trouble was encountered from decomposition of any of the formulations, and the finished films were not discolored by exposure to hydrogen sulfide gas.

It will be understood that in many of the above cases, the products are mixtures containing compounds in accordance with Formula I above. In all cases, it is estimated that the products contain at least 90% by weight of the compounds of Formula I.

EXAMPLE II

| | Parts |
|---|---|
| Vincyl chloride resin (various commercial resins per Table IV) | 100 |
| Methyltin trimercaptide of cocoanut mercaptans (item 3 of Table III) | 0-2 (per Table IV) |
| Di(2-ethylhexyl)phthalate | 46 |
| Tricalcium phosphate | 1 |
| Silicate pigment | 1 |

A series of compositions was made up in accordance with the foregoing schedule, using the various commercial resins set forth in Table IV hereinbelow. Each composition was compounded and tested as described in Example I. Following are the results of the tests.

Table IV

| Resin | Am't. Used (parts by weight) | Color of Test Specimen After Exposure in Oven for— | | | | | Run No. |
|---|---|---|---|---|---|---|---|
| | | 15 Min. | 30 Min. | 60 Min. | 90 Min. | 120 Min. | |
| Geon 101 (homopolymer of vinyl chloride; manufactured by the B. F. Goodrich Co.). | 0 | off-white | dusty rose | red-brown | brown | brown | 1 |
| | 1 | white | white | off-white | faint straw | pale straw | 2 |
| | 2 | do | do | do | pale straw | do | 3 |
| Geon 202 (copolymer of 90% vinyl chloride, 10% vinylidene chloride, manufactured by the B. F. Goodrich Co.). | 0 | do | dusty rose | tan | brown | brown | 4 |
| | 1 | do | white | off-white | straw | sooty straw | 5 |
| | 2 | do | do | do | pale straw | straw, black | 6 |
| Vinylite VYNW* (copolymer of 96% vinyl chloride, 4% vinyl acetate, manufactured by the Carbide & Carbon Chemicals Corp.). | 0 | rose | dusty rose | tan | brown | dark brown | 7 |
| | 1 | white | white | pale straw | dark straw | brown | 8 |
| | 2 | do | do | do | straw | do | 9 |
| Vinylite VYNS$^b$ (copolymer of 88% vinyl chloride, 12% vinyl acetate, manufactured by the Carbide & Carbon Chemicals Corp.). | 0 | rose | light brown | brown | dark brown | very dark brown | 10 |
| | 1 | white | white | do | do | | 11 |
| | 2 | do | do | dark straw | brown | black | 12 |
| Marvinol VR-10 (vinyl chloride-vinylidene chloride copolymer; manufactured by the U. S. Rubber Co.). | 0 | off-white | faint rose | tan | do | dark brown | 13 |
| | 1 | white | off-white | faint tan | light tan | light brown | 14 |
| | 2 | do | do | pale straw | pale straw | straw | 15 |
| Pliovic* (copolymer of 90% vinyl chloride, 10% diethyl maleate; manufactured by the Goodyear Tire & Rubber Co.). | 0 | off-white | rose | brown | dark brown | dark brown | 16 |
| | 1 | white | off-white | dark straw | light brown | brown | 17 |
| | 2 | do | do | pale straw | straw | light brown | 18 |
| Ultron 300 (a homopolymer of vinyl chloride manufactured by the Monsanto Chemical Co.). | 0 | do | rose | tan | brown | brown | 19 |
| | 1 | do | off-white | off-white | straw | straw | 20 |
| | 2 | do | white | do | pale straw | do | 21 |

*ᵃ In compositions involving this resin, only 33 parts of the di(2-ethylhexyl)phthalate were used, instead of 46 parts.*
*ᵇ In compositions involving this resin, only 33 parts of the di(2-ethylhexyl) phthalate were used, instead of 46 parts, and the specimens were exposed to the oven on glass microscope slides, on account of the extreme softness of the resin.*

From the foregoing general discussion and detailed specific examples, it will be evident that this invention provides novel stabilized vinyl chloride resin compositions capable of withstanding more rigorous conditions of heat and mechanical working than any comparable prior art compositions, with the possible exception of lead-stabilized compositions, which are subject to discoloration. This greater stability permits the compositions of this invention to be worked and calendered at higher temperatures and speeds, to yield films and other products of improved homogeneity, clarity and strength.

What is claimed is:

1. A resinous composition which is stable to heat and mechanical working, comprising a resin selected from the group consisting of polymers of vinyl chloride and copolymers thereof with other ethylenically unsaturated compounds copolymerizable therewith and containing at least 60% of vinyl chloride copolymerized therein, together with from 0.25% to 5%, based on the weight of vinyl chloride resin in the composition, of a compound of the formula

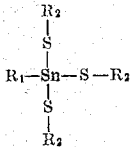

in which formula R$_1$, independently in each occurrence, represents an organic radical consisting of and containing from 1 to 22 carbon atoms, hydrogen, carbon-carbon single bonds, carbon-hydrogen bonds, up to 11 aromatic ring carbon-carbon double bonds, and up to 4 innocuous structures selected from the group consisting of carbon-carbon triple bonds, aliphatic carbon-carbon double bonds, ether linkages, thioether linkages, carboxylic ester groups bonded to carbon atoms, fluorine atoms bonded to carbon and halogen atoms bonded to aromatic ring carbon atoms, each R$_1$ being linked to the tin atom in the formulae hereinabove and hereinbelow by one of its carbon atoms, and R$_2$, independently in each occurrence, represents an organic radical consisting of and containing from 1 to 22 carbon atoms, hydrogen, carbon-carbon single bonds, carbon-hydrogen bonds, up to 11 aromatic ring carbon-carbon double bonds, and up to 4 innocuous structures selected from the group consisting of carbon-carbon triple bonds, aliphatic carbon-carbon double bonds, hydroxyl groups bonded to carbon, sulfhydryl groups bonded to carbon, ether linkages, thioether linkages, carboxylic ester groups bonded to carbon, carboxylic amide groups bonded to carbon, fluorine atoms bonded to carbon, halogen atoms bonded to aromatic ring carbon and groups of the formula

under the same notation, each of the radicals R$_2$ being linked to its respective sulfur atom in the formulae by one of its carbon atoms.

2. A resinous composition stable to heat and mechanical working comprising a resin selected from the group consisting of polymers of vinyl chloride and copolymers thereof with other unsaturated compounds copolymerizable therewith containing at least 80% of vinyl chloride copolymerized therein, together with from 0.5 to 5.0%, based on the weight of the resin in said composition, of methyltin trimercaptide of the mercaptans derived from cocoanut oil fatty acids.

3. A resinous composition stable to heat and mechanical working comprising a resin selected from the group consisting of polymers of vinyl chloride and copolymers thereof with other unsaturated compounds copolymerizable therewith containing at least 80% of vinyl chloride copolymerized therein, together with from 0.5 to 5.0%, based on the weight of the resin in said composition, of butyltin trimercaptide of the mercaptans derived from cocoanut oil fatty acids.

4. A resinous composition stable to heat and mechanical working comprising a resin selected from the group consisting of polymers of vinyl chloride and copolymers thereof with other unsaturated compounds copolymerizable therewith containing at least 80% of vinyl chloride copolymerized therein, together with from 0.5 to 5.0%, based on the weight of the resin in said composition, of butyltin tri(p-cresyl) mercaptide.

5. A resinous composition stable to heat and mechanical working comprising a resin selected from the group consisting of polymers of vinyl chloride and copolymers thereof with other unsaturated compounds copolymerizable therewith containing at least 80% of vinyl chloride copolymerized therein, together with from 0.5 to 5.0%, based on the weight of the resin in said composition, of phenyltin trimercaptide of the mercaptans derived from cocoanut oil fatty acids.

6. A resinous composition stable to heat and mechanical working comprising a resin selected from the group consisting of polymers of vinyl chloride and copolymers thereof with other unsaturated compounds copolymerizable therewith containing at least 80% of vinyl chloride copolymerized therein, together with from 0.5 to 5.0% based on the weight of the resin in said composition, of 2-thienyltin trimercaptide of the mercaptans derived from cocoanut oil fatty acids.

7. A thin, flexible film of a resinous composition which is stable to heat and mechanical working, comprising a resin selected from the group consisting of polymers of vinyl chloride and copolymers thereof with other ethylenically unsaturated compounds copolymerizable therewith and containing at least 60% of vinyl chloride copolymerized therein, together with from 0.25% to 5%, based on the weight of vinyl chloride resin in the composition, of a compound of the formula

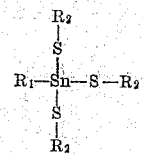

in which formula $R_1$, independently in each occurrence, represents an organic radical consisting of and containing from 1 to 22 carbon atoms, hydrogen, carbon-carbon single bonds, carbon-hydrogen bonds, up to 11 aromatic ring carbon-carbon double bonds, and up to 4 innocuous structures selected from the group consisting of carbon-carbon triple bonds, aliphatic carbon-carbon double bonds, ether linkages, thioether linkages, carboxylic ester groups bonded to carbon atoms, fluorine atoms bonded to carbon, and halogen atoms bonded to aromatic ring carbon atoms, each $R_1$ being linked to the tin atom in the formulae hereinabove and hereinbelow by one of its carbon atoms, and $R_2$, independently in each occurrence, represents an organic radical consisting of and containing from 1 to 22 carbon atoms, hydrogen, carbon-carbon single bonds, carbon-hydrogen bonds, up to 11 aromatic ring carbon-carbon double bonds, and up to 4 innocuous structures selected from the group consisting of carbon-carbon triple bonds, aliphatic carbon-carbon double bonds, hydroxyl groups bonded to carbon, sulfhydryl groups bonded to carbon, ether linkages, thioether linkages, carboxylic ester groups bonded to carbon, carboxylic amide groups bonded to carbon, fluorine atoms bonded to carbon, halogen atoms bonded to aromatic ring carbon and groups of the formula

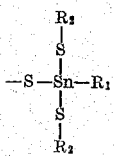

under the same notation, each of the radicals $R_2$ being linked to its respective sulfur atom in the formulae by one of its carbon atoms.

8. A thin, transparent, flexible film of a resinous composition stable to heat and mechanical working comprising a resin selected from the group consisting of polymers of vinyl chloride and copolymers thereof with other unsaturated compounds copolymerizable therewith containing at least 80% of vinyl chloride copolymerized therein, together with from 0.5 to 5.0%, based on the weight of the resin in said composition, of methyltin trimercaptide of the mercaptans derived from cocoanut oil fatty acids.

9. A thin, transparent, flexible film of a resinous composition stable to heat and mechanical working comprising a resin selected from the group consisting of polymers of vinyl chloride and copolymers thereof with other unsaturated compounds copolymerizable therewith containing at least 80% of vinyl chloride copolymerized therein, together with from 0.5 to 5.0%, based on the weight of the resin in said composition, of butyltin trimercaptide of the mercaptans derived from cocoanut oil fatty acids.

10. A thin, transparent, flexible film of a resinous composition stable to heat and mechanical working comprising a resin selected from the group consisting of polymers of vinyl chloride and copolymers thereof with other unsaturated compounds copolymerizable therewith containing at least 80% of vinyl chloride copolymerized therein, together with from 0.5 to 5.0%, based on the weight of the resin in said composition, of butyltin tri-(p-cresyl) mercaptide.

11. A thin, transparent, flexible film of a resinous composition stable to heat and mechanical working comprising a resin selected from the group consisting of polymers of vinyl chloride and copolymers thereof with other unsaturated compounds copolymerizable therewith containing at least 80% of vinyl chloride copolymerized therein, together with from 0.5 to 5.0%, based on the weight of the resin in said composition, of phenyltin trimercaptide of the mercaptans derived from cocoanut oil fatty acids.

12. A thin, transparent, flexible film of a resinous composition stable to heat and mechanical working comprising a resin selected from the group consisting of polymers of vinyl chloride and copolymers thereof with other unsaturated compounds copolymerizable therewith containing at least 80% of vinyl chloride copolymerized therein, together with from 0.5 to 5.0%, based on the weight of the resin in said composition, of 2-thienyltin trimercaptide of the mercaptans derived from cocoanut oil fatty acids.

13. Process which comprises calendering, at temperatures from 315° to 400° F., a resinous composition which is stable to heat and mechanical working, comprising a resin selected from the group consisting of polymers of vinyl chloride and copolymers thereof with other ethylenically unsaturated compounds copolymerizable therewith and containing at least 60% of vinyl chloride copolymerized therein, together with from 0.25% to 5%, based on the weight of vinyl chloride resin in the composition, of a compound of the formula

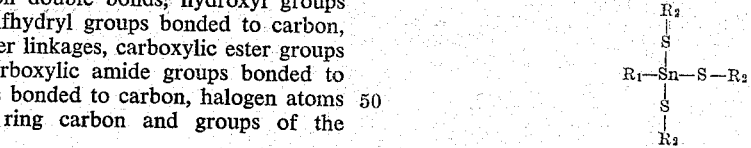

in which formula $R_1$, independently in each occurrence, represents an organic radical consisting of and containing from 1 to 22 carbon atoms, hydrogen, carbon-carbon single bonds, carbon-hydrogen bonds, up to 11 aromatic ring carbon-carbon double bonds, and up to 4 innocuous structures selected from the group consisting of carbon-carbon triple bonds, aliphatic carbon-carbon double bonds, ether linkages, thioether linkages, carboxylic ester groups bonded to carbon atoms, fluorine bonded to carbon and halogen atoms bonded to aromatic ring carbon atoms, each $R_1$ being linked to the tin atom in the formulae hereinabove and hereinbelow by one of its carbon atoms, and $R_2$, independently in each occurrence, represents an organic radical consisting of and containing from 1 to 22 carbon atoms, hydrogen, carbon-carbon single bonds, carbon-hydrogen bonds, up to 11 aromatic ring carbon-carbon double bonds, and up to 4 innocuous structures selected from the group consisting of carbon-carbon triple bonds, aliphatic carbon-carbon double bonds, hydroxyl groups bonded to carbon, sulfydryl groups bonded to carbon, ether linkages, thioether linkages, carboxylic ester groups bonded to carbon, carboxylic amide groups bonded to carbon, fluorine atoms bonded to carbon, halogen atoms bonded to aromatic ring carbon and groups of the formula $$-S-\underset{\underset{R_2}{|}}{\overset{\overset{R_2}{|}}{Sn}}-R_1$$

under the same notation, each of the radicals R₂ being linked to its respective sulfur atom in the formulae by one its carbon atoms.

14. Process which comprises calendering, at temperatures from 315° to 400° F., a resinous composition stable to heat and mechanical working comprising a resin selected from the group consisting of polymers of vinyl chloride and copolymers thereof with other unsaturated compounds copolymerizable therewith containing at least 80% of vinyl chloride copolymerized therein, together with from 0.5 to 5.0%, based on the weight of the resin in said composition, of methyltin trimercaptide of the mercaptans derived from cocoanut oil fatty acids.

15. Process which comprises calendering, at temperatures from 315° to 400° F., a resinous composition stable to heat and mechanical working comprising a resin selected from the group consisting of polymers of vinyl chloride and copolymers thereof with other unsaturated compounds copolymerizable therewith containing at least 80% of vinyl chloride copolymerized therein, together with from 0.5 to 5.0%, based on the weight of the resin in said composition, of butyltin trimercaptide of the mercaptans derived from cocoanut oil fatty acids.

16. Process which comprises calendering, at temperatures from 315° to 400° F., a resinous composition stable to heat and mechanical working comprising a resin selected from the group consisting of polymers of vinyl chloride and copolymers thereof with other unsaturated compounds copolymerizable therewith containing at least 80% of vinyl chloride copolymerized therein, together with from 0.5 to 5.0%, based on the weight of the resin in said composition, of butyltin tri(p-cresyl) mercaptide.

17. Process which comprises calendering, at temperatures from 315° to 400° F., a resinous composition stable to heat and mechanical working comprising a resin selected from the group consisting of polymers of vinyl chloride and copolymers thereof with other unsaturated compounds copolymerizable therewith containing at least 80% of vinyl chloride copolymerized therein, together with from 0.5 to 5.0%, based on the weight of the resin in said composition, of phenyltin trimercaptide of the mercaptans derived from cocoanut oil fatty acids.

18. Process which comprises calendering, at temperatures from 315° to 400° F., a resinous composition stable to heat and mechanical working comprising a resin selected from the group consisting of polymers of vinyl chloride and copolymers thereof with other unsaturated compounds copolymerizable therewith containing at least 80% of vinyl chloride copolymerized therein, together with from 0.5 to 5.0%, based on the weight of the resin in said composition, of 2-thienyltin trimercaptide of the mercaptans derived from cocoanut oil fatty acids.

19. A composition of improved heat stability comprising a blend of a polyvinyl chloride resin and 0.5 to 5.0%, based on the weight of the resin in said composition, of butyl tin tributyl mercaptide as the stabilizer therefor.

20. A composition of improved heat stability comprising a blend of a polyvinyl chloride resin and 0.5 to 5.0%, based on the weight of the resin in said composition, of a mercaptide as the stabilizer therefor, the mercaptide being a compound of the type formula $$(R^1S)_3SnR^2$$

in which $R^1$ and $R^2$ represent alkyl radicals containing 1 to 18 carbons each.

21. A composition of improved heat stability comprising a blend of a polyvinyl chloride resin and 0.5 to 5.0%, based on the weight of the resin in said composition, of a mercaptide as the stabilizer therefor, the mercaptide being a compound of the type formula $$(R^1S)_3SnR^2$$

in which $R^1$ and $R^2$ represent aryl radicals containing 6 to 18 carbons each.

22. A composition of improved heat stability comprising a blend of a polyvinyl chloride resin and 0.5 to 5.0%, based on the weight of resin in said composition, of a trimercaptide as a stabilizer therefor, the trimercaptide being a compound of the type formula $$R_1-Sn(SR_2)_3$$

where $R_1$ and $R_2$ are members of the group consisting of alkyl and aryl.

No references cited.